UNITED STATES PATENT OFFICE.

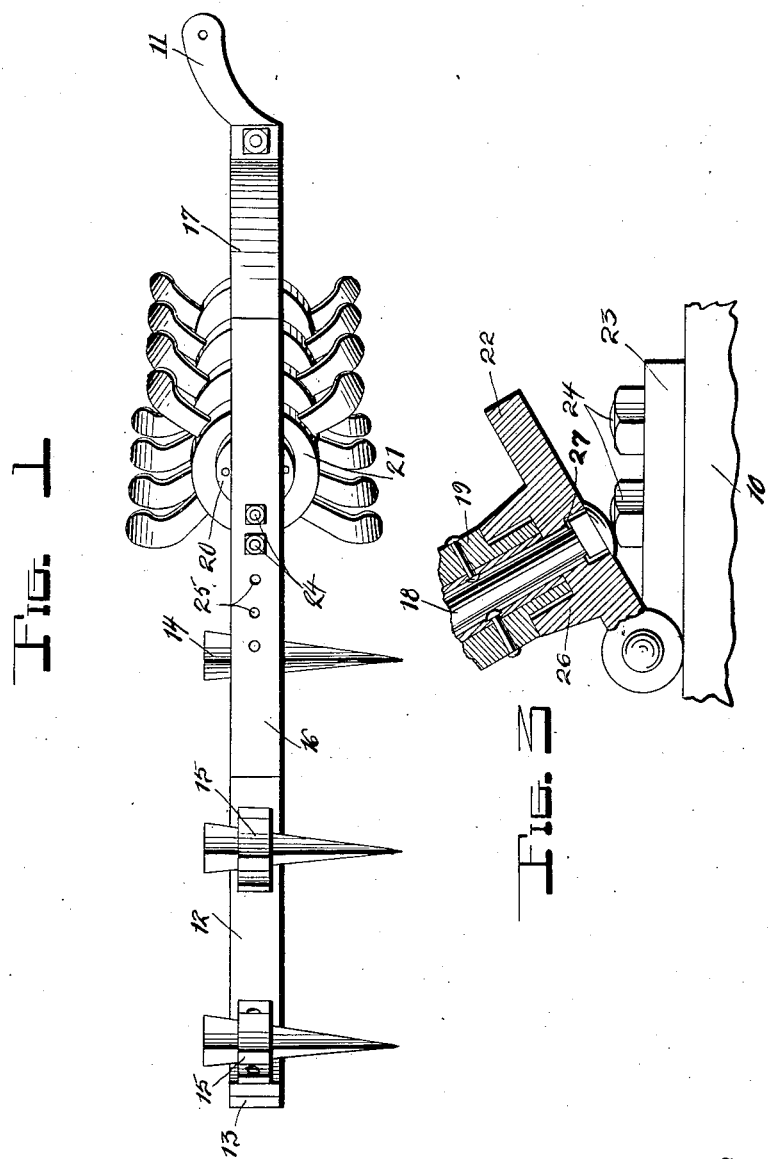

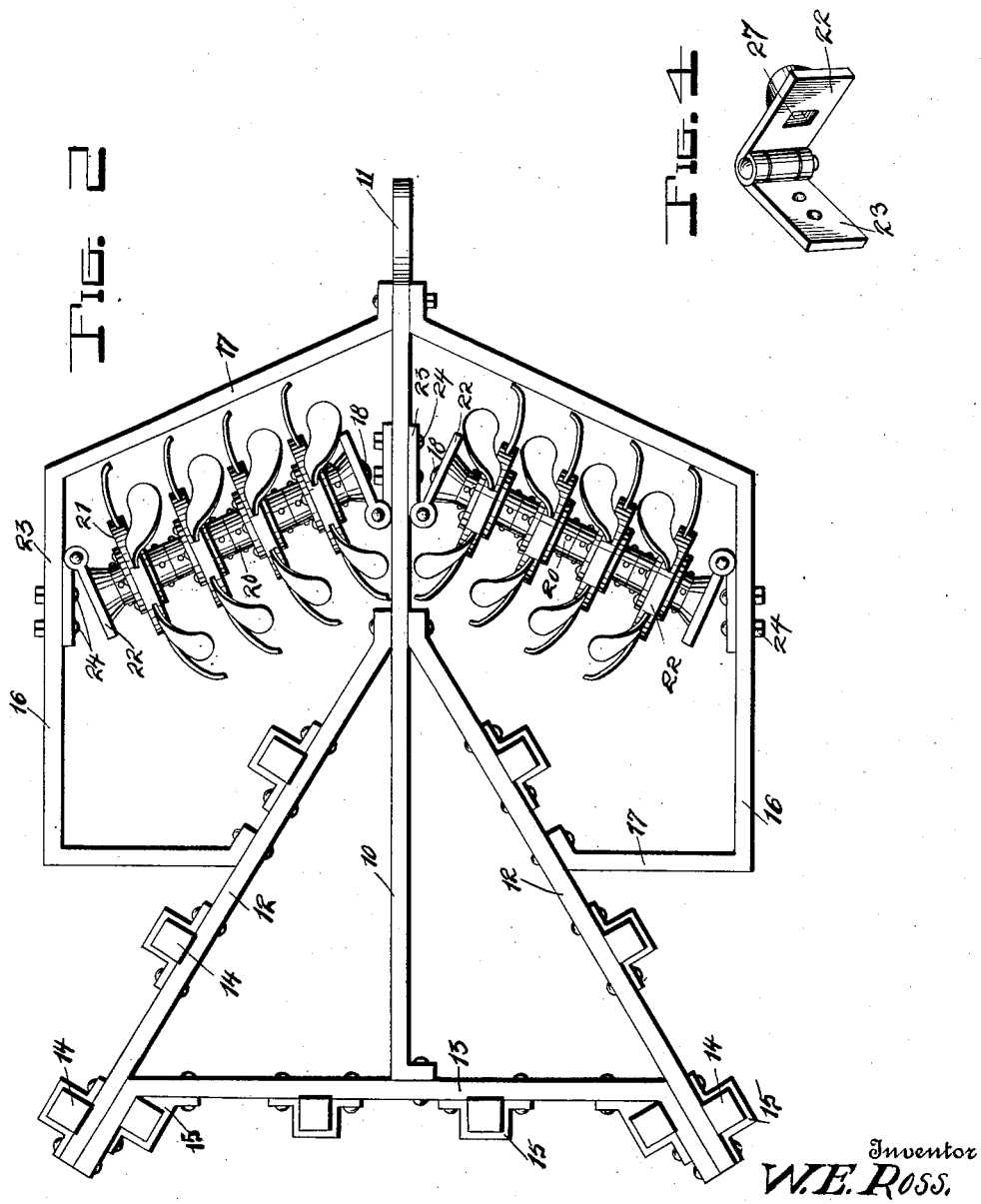

WILLIAM E. ROSS, OF DUQUOIN, ILLINOIS.

HARROW.

1,033,620.  Specification of Letters Patent.  Patented July 23, 1912.

Original application filed November 28, 1910, Serial No. 594,609. Divided and this application filed October 19, 1911. Serial No. 655,492.

*To all whom it may concern:*

Be it known that I, WILLIAM E. Ross, a citizen of the United States, residing at Duquoin, in the county of Perry, State of Illinois, have invented certain new and useful Improvements in Harrows; and I do hereby declare the following to be a full, clear, and exact description of the invention, such as will enable others skilled in the art to which it appertains to make and use the same.

This invention relates to harrows of that general class described in my co-pending application for Letters Patent filed Nov. 28, 1910, Ser. No. 594,609, of which this application is a division and has for an object to provide a harrow formed of separate sections detachably secured together, one of the sections carrying teeth and the other carrying disks, the removal of the disk carrying sections being effected without disturbing the connections between the tooth carrying section.

A further object of the invention is to provide a harrow having a skeleton frame to the sides of which the ends of a disk carrying shaft are hinged, means being provided for adjustably securing the shaft in various positions.

With the above and other objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of a harrow constructed in accordance with my invention. Fig. 2 is a plan view of the harrow. Fig. 3 is a fragmentary view of one of the hinges with parts in section. Fig. 4 is a detail perspective view of another of the hinges.

Referring now to the drawings in which like characters of reference designate similar parts, 10 designates the harrow draft beam which is provided at its forward end with an upwardly curving goose neck 11 to which may be attached any desired draft mechanism. A pair of outwardly inclined wings 12 are secured at their forward ends to the draft beam by bolts, rivets or otherwise, both wings being held in rigid relation to the draft beam through the instrumentality of a cross brace 13 which is bolted or otherwise secured intermediate its ends to the extreme rear end of the draft beam, and is bolted or otherwise secured terminally to the rear ends of the wings. A plurality of teeth 14 are secured at spaced intervals along the outer faces of both wings, strap brackets 15 being utilized in securing the teeth in position as shown.

The harrow above described may be used under ordinary conditions of service, but when it is desired to break up plowed ground very thoroughly, disk carrying frames are attached to opposite sides of the draft beam and to the wings as will presently be described. The disk carrying frame together with the disks thereof are identical in construction so that but one will now be described.

Each frame comprises a side bar 16 the opposite ends of which are bent laterally on the same side of the bar and form legs 17, the forward leg being bolted or otherwise secured to the draft beam 10, and the rear leg being bolted or otherwise secured to the intermediate portion of the adjacent wing 17. The disk carrying shaft is hingedly connected to the draft beam and to the side bar, one end of the shaft being adjustable along the side bar so that the angular inclination of the disks to the draft beam may be varied when desired. To attain this end the following construction is employed: The disk carrying shaft comprises a bolt 18 upon which is loosely mounted a pipe or sleeve 19 to which are riveted the hubs 20 of disks 21. Thus the disks rotate simultaneously on the bolt as an axis. Arranged upon the draft beam, and also upon the side bar are hinges each comprising two leaves 22 and 23. One of the leaves is provided with bolt openings through which securing bolts 24 are passed, the securing bolts of the hinge which is mounted on the side bar being selectively engageable in a series of openings 25 formed in the side bar to permit of the hinge being adjusted longitudinally of the bar. The free leaf of each hinge is provided on its outer face with a socket member 26 which loosely receives the adjacent end of the sleeve 19 as clearly shown in Fig. 3. The bolt 18 as will be seen by referring to Fig. 3 extends axially through the sleeve and is secured in suitable openings 27 formed in the free leaves of the hinges.

From the above description it will be seen that the hinges at both ends of the disk shaft will have opening movement when the hinge on the side bar is moved rearwardly upon the latter to vary the inclination of the disks, and will have closing movement when the reverse movement of the adjustably mounted hinge is effected, the ends of the sleeve loosely working in the socket members to accommodate these movements of the hinges.

What is claimed, is:—

1. A harrow including a skeleton frame, a shaft within said frame, disks on said shaft, a hinge having one leaf secured to one side of said frame and having its free leaf loosely journaling the confronting end of said shaft, and a second hinge having one leaf adjustably secured to the opposite side of said frame and having its free leaf loosely journaling the confronting end of said shaft.

2. A harrow including a draft beam, divergent tooth carrying wings carried by said draft beam, detachable disk carrying frames on opposite sides of said draft beam, each comprising a side bar having its ends bent laterally on the same side of the bar and forming legs, one leg being secured to said draft beam, and the other leg being secured to the intermediate portion of the adjacent wing, shafts within said frames having their inner ends hingedly secured to said draft beam, and having their outer ends hingedly and adjustably secured to said side bars, and disks on said shafts.

3. A harrow including a skeleton frame, hinges secured to the opposite sides of said frame each comprising two leaves, one leaf of one of the hinges being secured to one side of said frame, and one leaf of the other of said hinges being adjustably secured to the opposite side of said frame, a shaft loosely journaled in the free leaves of said hinges, and ground penetrating projections on said shaft.

4. A harrow including a skeleton frame, hinges each having a leaf secured to said frame, a shaft having its opposite ends journaled in the free leaves of said hinges, a sleeve on said shaft, and disks fixed on said sleeve.

In testimony whereof, I affix my signature, in presence of two witnesses.

WILLIAM E. ROSS.

Witnesses:
E. C. MORROW,
ANNA L. DOWELL.

---

Copies of this patent may be obtained for five cents each, by addressing the "Commissioner of Patents, Washington, D. C."